United States Patent [19]

Okamoto et al.

[11] 4,072,658
[45] Feb. 7, 1978

[54] NOVEL PHOSPHORUS- AND BROMINE-CONTAINING POLYMERS

[75] Inventors: Kazuo Okamoto, Osaka; Hiroshi Uchio, Settsu, both of Japan

[73] Assignee: Kanebo, Ltd., Tokyo, Japan

[21] Appl. No.: 578,033

[22] Filed: May 15, 1975

[30] Foreign Application Priority Data

May 18, 1974 Japan .................................. 49-55706
Jan. 8, 1975 Japan .................................. 50-5136

[51] Int. Cl.$^2$ ...................... C08G 65/40; C08G 79/04
[52] U.S. Cl. .......................................... 260/49; 260/9; 260/47 P; 260/857 R; 260/858; 260/860; 260/874; 260/897 C; 260/930
[58] Field of Search ...................... 260/49, 47 P, 930

[56] References Cited
U.S. PATENT DOCUMENTS

| | | | |
|---|---|---|---|
| 2,435,252 | 2/1948 | Toy | 260/6 |
| 2,572,076 | 10/1951 | Toy | 260/61 |
| 3,326,852 | 6/1967 | Thomas | 260/47 |

*Primary Examiner*—Lester L. Lee
*Attorney, Agent, or Firm*—Blanchard, Flynn, Thiel, Boutell & Tanis

[57] ABSTRACT

Phosphorus and bromine-containing polymers having the formula

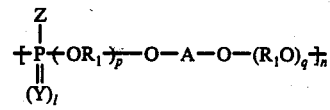

wherein $R_1$ is an alkylene group having 2-3 carbon atoms;

A is 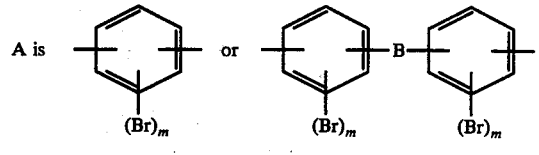

wherein $m$ is an integer of 1–4 and B is an alkylene or alkylidene group having 1–6 carbon atoms or sulfone group; Z is $-R_2$ or $-OR_2$, provided that $R_2$ is an alkyl or aryl group; Y is sulfur or oxygen; $l$ is 0 or 1; $p$ and $q$ are integers of at least 1 and a sum of $p$ and $q$ is an integer of not more than 4; and $n$ is an integer of 3–40 are colorless and have an excellent thermal property. The polymers are excellent as a flame retardant for inflammable organic high polymers, and flame compositions having excellent washing resistance, light resistance and whiteness can be obtained by compounding the phosphorus- and bromine-containing polymer with the inflammable organic high polymer.

15 Claims, No Drawings

NOVEL PHOSPHORUS- AND BROMINE-CONTAINING POLYMERS

The present invention relates to novel phosphorus and bromine-containing polymers and flame resistant compositions of inflammable organic high polymers containing the former polymers as a flame retardant.

Among inflammable organic high polymers, polyesters, polyacryls, polyamides, polyurethanes, polyolefins and cellulose are broadly utilized as fibers, films and the other plastic shaped articles and are very useful materials but they have a defect of inflammability and recently it has been strongly demanded that these polymers be made flame resistant.

In general, it has been well known that in order to make these inflammable organic high polymers flame resistant it is effective to blend therewith a compound containing phosphorus, halogen and antimony atoms but a major part of the conventional well known flame retardants are very poor in heat stability and when such flame retardants are compounded in the inflammable organic high polymers and the resulting composition is molded, thermal decomposition, coloration or foaming is apt to occur and the flame retardants have no compatibility with the inflammable organic high polymers and separate from said high polymers. Accordingly, there are many problems in practice.

For example, Japanese Pat. No. 678,720 discloses that perbromobenzene is mixed with polyethylene terephthalate and the mixture is melt spun. However, in such a process, the perbromobenzene is a low molecular weight halogen compound, so that said compound has a noticeable sublimation and during melt spinning, the spinneret surface and the guide portion are stained by the sublimation and yarn breakage occurs the sublimated smoke causes a problem in view of health requirement and a very strict control is required in operation. Even if these problems can be solved, the obtained filaments are deteriorated in the yarn properties and the light resistance and are easily colored and further since the flame retardant is a low molecular weight substance, such a flame retardant is easily soluble in an organic solvent and consequently such a flame retardant is easily removed by dry cleaning and there are many problems in practice.

When a phosphorous acid ester, a phosphoric acid ester or a phosphoric acid ester containing halogen atom is mixed with polyethylene terephthalate and the resulting mixture is melt molded, for example, melt spun, such phosphoric acid ester is a low molecular weight substance, so that upon the melt mixing an ester interchange reaction occurs between polyethylene terephthalate and such phosphoric acid ester or the polymerization degree and the melt viscosity of polyethylene terephthalate considerably diminish due to the thermal decomposition and the spinning becomes very difficult or cannot be effected. Even if the spinning can be effected, the yarn property of the spun filaments diminishes and a noticeable coloration or sublimation is caused and there is a problem in practice. In addition, it has been known to compound a phosphorus- and bromine-containing compound, such as tris-2,3-dibromopropyl phosphate, but such phosphates, which are low molecular weight substances and in which the alkyl group is substituted with bromine, are very poor in heat stability and are almost thermally decomposed at a temperature of lower than 200° C and such phosphates are decomposed upon molding of the organic high polymers compounded with such phosphates, and coloration and foaming occur and the commercial value of the product is considerably deteriorated.

As mentioned above, the relatively low molecular weight flame retardants are easily sublimated, thermally decomposed, colored and dissolved out or fall off and various properties of the compounded organic high polymers are degraded. In order to overcome these defects, various high molecular weight retardants have been developed.

For example, Japanese Patent Application Publication No. 32,297/72 disclosed that a polyphosphonate obtained by polycondensing an aromatic diol, such as hydroquinone, biphenol, bisphenol or naphthalene-diol with arylphosphonic acid dichloride, is admixed to polyesters. In this process, a phosphoric acid ester bond is contained but the flame retardant is a polymer, so that the polymerization degree and the melt viscosity of the polyester are not relatively decreased and the melt spinning can be effected and such a process is preferable.

However, since the phosphorus content in the polyphosphonate is small, a large amount of the polyphosphonate should be added in order to give a satisfactory flame resistance by means of such a polyphosphonate, so that various properties of the polyester are considerably degraded. When such a polyphosphonate is added in such an amount that the various properties are not deteriorated, the flame retarding effect cannot be satisfactorily developed. It has been generally well known that when halogen and phosphorus are used together, the flame resistance can be considerably improved by a synergistic effect.

From such a view, it has been disclosed that some phosphorus- and halogen-containing polymers are produced and such polymers are compounded in inflammable organic high polymers. For example, Angewandte Chemie 70 350 (1958) discloses that phenoxyphosphorus dichloride is reacted with quinone to form phosphorus- and halogen-containing polymer and Industrial Engineering Chemistry 409(1960) discloses that phenyldichlorophosphine oxide is polycondensed with halobisphenols to form phosphorus- and halogen-containing polymer. In addition, Japanese Pat. No. 669,287 discloses that the phosphorus- and halogen-containing polymer obtained by polycondensing phenyldichlorophosphine oxide with halobisphenols is admixed with polyethylene terephthalate to render the polyethylene terephthalate flame resistant. However, the halobisphenols contain a relatively low reactive phenolic hydroxyl group and the ortho-position is halogenated, so that the reactivity of the phenolic hydroxyl group is further decreased due to the steric hindrance and the ortho-position effect and consequently the temperature for polycondensation with phosphorus halide usually needs a high temperature of higher than 200° C. Accordingly, the resulting phosphorus- and halogen-containing polymer is considerably colored and it is difficult to obtain a high polymer and the thermal property is considerably poor. Since such phosphorus- and halogen-containing polymer contains halogen and phosphorus, if such a polymer is compounded in the polyethylene terephthalate, a good flame resistance can be provided, but since the phosphorus- and halogen-containing polymer is considerably colored and is poor in the thermal property, the compounded polyethylene terephthalate is not only considerably stained but also the mechanical and thermal properties are considerably degraded and even if the flame resistance can be provided, the commercial value of the fiber or synthetic resin is highly deteriorated. Furthermore, according to the knowledge of the inventors, the polyester compounded with such phosphorus- and halogen-containing polymer has a considerably poor light resistance.

In addition, Japanese Pat. No. 585,205 has proposed that an epoxy compound is reacted with a mixture of phosphorus trihalide and phosphorus oxyhalide at a temperature of lower than 180° C. In such a process, the functional group is an epoxy group and is active and a high reaction temperature is not needed, so that the coloration can be relatively restrained but the resulting polymers have a three dimensional structure and if the polymerization degree is increased, an insoluble and infusible polymer is formed and the adjustment of the reaction is very difficult. Moreover, in the formed polymer, a halogen is introduced into an alkylene group, so that even if a polymer is formed, said polymer is easily thermally decomposed at a temperature of higher than 180° C and the thermal property is considerably degraded.

For example, even if it is intended that the inflammable high polymers which require melt molding, are rendered flame resistant by compounding such a flame retardant, the resulting composition is decomposed or gelatinized upon molding and the molding cannot be carried out. On the other hand, even if the flame resistance is provided by depositing the flame retardant on the surface of the molded article, such as fibers, there is no washing resistance and the resulting product is sticky or becomes coarse and rigid and the commercial value is considerably lowered.

As mentioned above, the application and performance of such a flame retardant are very limited.

German Pat. No. 1,252,413 discloses that a condensate of 2,2'-bis[3,5-dibromo-4-(2-hydroxyethoxy)-phenyl]propane with 2-bromoethyldichlorophosphate is compounded in an unsaturated polyester and then the mixture is cured, whereby the flame resistance is obtained. Such phosphorus-and bromine-containing condensate is similar to the flame retardant of the present invention but contains 2-bromoethyl phosphate skeleton and the alkyl group is substituted with halogen, so that such a condensate is very thermally unstable. For example, if such a condensate is compounded in polyethylene terephthalate and the mixture is melt spun, such a condensate is thermally decomposed and a considerable coloration and a lowering of the physical properties are caused. That is, the application is very limited and such a condensate cannot be used at all for a material which needs a high temperature of higher than 200° C.

Accordingly, it is desired to provide flame retardants having excellent properties which can be used for a variety of applications, which do not stain the inflammable organic high polymers but rather maintain same colorless, which have such a thermal property that they endure melt molding at a high temperature of higher than 200° C and which can provide permanent flame resistance.

The inventors have diligently studied in order to improve the above described defects of flame retardants containing halogen and phosphorus and found that the novel phosphorus- and bromine-containing polymers according to the present invention can develop a noticeable flame resistant effect on the inflammable organic high polymers and further improve the light resistance greatly and the present invention has been accomplished.

A first object of the present invention is to provide novel phosphorus- and bromine-containing polymers.

A second object of the present invention is to provide phosphorus- and bromine-containing polymers having excellent colorless and thermal properties.

A third object of the present invention is to provide flame retardants having excellent properties for inflammable organic high polymers.

A fourth object of the present invention is to provide flame resistant compositions of inflammable organic high polymers having excellent washing resistance, light resistance and whiteness.

The present invention consists in novel phosphorus- and bromine-containing polymers obtained by reacting at least one of bromine-containing compounds shown by the following general formula (I).

$$H(OR_1)_pOAO(R_1O)_qH \qquad (I)$$

wherein $R_1$ is an alkylene group having 2-3 carbon atoms, $p$ and $q$ are integers of at least 1 and a sum of $p$ and $q$ is an integer of not more than 4 and A is

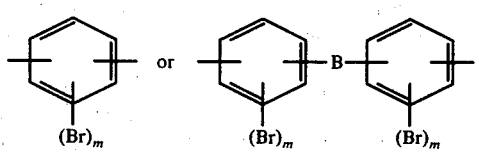

wherein $m$ is an integer of 1-4 and B is an alkylene or alkylidene group having 1-6 carbon atoms or sulfone group, with at least one of phosphorus halide compounds shown by the following general formula (II).

wherein Z is $-R_2$ or $-OR_2$, provided that $R_2$ is an alkyl or aryl group, X is chlorine or bromine, Y is sulfur or oxygen and $l$ is 0 or 1, at a temperature of lower than 180° C and flame resistant compositions compounded with 3-30% by weight, based on inflammable organic high polymers, of said novel phosphorus- and bromine-containing polymer.

In the present invention, the feeding molar ratio of the bromine-containing compound shown by the general formula (I) to the phosphorus halide compound shown by the general formula (II) is 1.0:0.9~1.5, preferably 1.0:0.9~.1. When the molar ratio of the bromine-containing compound is larger than the above described upper limit, the unreacted monomer and a low molecular weight substance are admixed in the resulting phosphorus- and bromine-containing polymer and the thermal property is degraded.

When the molar ratio of the phosphorus halide compound is too large, it is difficult to obtain the high molecular weight polymer. Since the functional group in the bromine-containing compound shown by the general formula (I) is very active, the reaction temperature varies depending upon the reaction process adopted but at a temperature of 0°-180° C, preferably 60°-160° C, the desired high polymer can be obtained. In general, a major part of bromine-containing compounds are thermally unstable and when said compounds are heated at a temperature above 180° C, said compounds are thermally decomposed and a dehydrogen bromide reaction occurs, but said compounds are very stable at a temperature of lower than 180° C and substantially no thermal decomposition occurs. It is one of characteristics of the method of the present invention that the functional group of the bromine-containing compounds used in the present invention is very active and said compounds are high in reactivity at a low temperature of lower than 180° C. For example, even if an aromatic hydroxyl group wherein the ortho position is substituted with a halogen and a phosphorus halide compound are heated at 180° C for 20 only 50—60% of the reactants are reacted, and even if the reactants are reacted at 130° C for 30 hours, the reaction does not at all proceed.

On the other hand, the terminal group of the bromine-containing compounds to be used in the present invention is an aliphatic hydroxyl group, so that the bromine-containing compound has a high activity and when the reactants are heated at 180° C, substantially 100% of the reaction proceeds within 5 minutes and even at 130° C, 98–100% of the reaction proceeds within 20 minutes. Since the reactivity is high as mentioned above, even if the reaction is effected at a temperature of higher than 180° C, the polymerization degree is not improved and rather the thermal decomposition is brought about and the polymerization degree lowers, so that such a temperature is not preferable. Surprisingly, it has been found that when the thermally unstable bromine-containing compound which is thermally decomposed at a temperature of higher than 180° C and causes coloration, is converted into a high molecular weight substance at a low temperature of lower than 180° C without causing the thermal decomposition, the thermal property of said resulting high molecular weight substance is considerably improved and said substance is stable at a high temperature of higher than 200° C.

The phosphorus- and bromine-containing linear polymers according to the present invention can be used for a variety of applications and are useful flame retardants having various excellent properties and flame resistance can be easily provided to inflammable organic high polymers by compounding 3–30% by weight of the flame retardant in said flammable organic high polymers.

In general, the following properties are required for the flame retardant.

(1) The flame retardant has a compatibility with the inflammable organic high polymers.
(2) The flame retardant has such a heat stability that when the flame retardant is blended within the thermoplastic synthetic resin, said flame retardant endures a high temperature of higher than 200° C necessary for melting or molding of said resin.
(3) The flame retardant does not cause sublimation and scattering upon heating or is not dissolved out or removed mechanically or by washing.
(4) The flame retardant does not deteriorate various properties of the inflammable high polymers.

The phosphorus- and bromine-containing polymers according to the present invention have a thermal decomposition temperature of higher that 250° C and do not sublimate and they satisfy the above described requirements.

The polymerization process for obtaining the phosphorus- and bromine-containing polymers according to the present invention by reacting the bromine-containing compound having the above formula (I) and the phosphorus halide compound having the above formula (II) includes melt polymerization, solution polymerization and interfacial polymerization and the process may be selected depending upon the object but the more preferable process is solution polymerization.

In these polymerization processes, the operation conditions usually carried out can be adopted. By one embodiment an explanation will be made with respect to the melt polymerization process. Into a system where the bromine-containing compound having the above formula (I) is heated and melted, the phosphorus halide compound having the above formula (II) is dropped and the reaction is effected, or reversely into a system of the phosphorus halide compound is introduced the bromine-containing compound. Alternatively, both the reactants are simultaneously fed into a system and the resulting mixture is heated while stirring and the reaction is effected in a molten state. The temperature in such a reaction must be higher by at least 5° C than the melting point of the resulting phosphorus- and bromine-containing compounds and up to 180° C. The generally used temperature is 120°–150° C. In this reaction, a small amount of polymerization promoter, such as calcium chloride, zinc chloride, and magnesium chloride may be added. A very active functional group is present and the reaction varies depending upon the reaction conditions, but the reaction period may be a short time, because the reaction rate is rapid and the reaction time is usually 0.5–3 hours. The pressure in the reaction system may be normal pressure, an elevated pressure or a reduced pressure and the reaction may be effected under air or an inert gaseous atmosphere.

In the case of solution polymerization, the reaction conditions vary depending upon the kind of solvent but a solvent which dissolves the bromine-containing compound (I) and the phosphorus halide compound (II) and the reaction product, is preferable, but a solvent which can dissolve the monomers (I) and (II) but does not dissolve the reaction product of the polymer, may be used. The addition may be effected by various processes. The bromine-containing compound is dissolved in a solvent and the phosphorus halide compound is added as such or in a solution in a solvent. Reversely, in a system wherein the phosphorus halide compound is dissolved in a solvent, there is added the bromine-containing compound in a solution in a solvent, in powder form or in a heated and melted state. Alternatively, the bromine-containing compound and the phosphorus halide compound are simultaneously fed in a solvent and the mixture is reacted by raising the temperature while stirring. The reaction temperature varies depending upon the solvent, bromine-containing compound and phosphorus halide compound used but it is usually 0°–180° C, preferably 60°–160° C. The reaction time varies depending upon the reaction temperature but is usually 0.1–8 hours and in general, the reaction is complete within 0.5–3 hours. Reaction at a high temperature for a long time should be avoided, because coloration occurs. The separation of the thus formed phosphorus- and bromine-containing polymer from the solvent may be effected by introducing the resulting polymer into a non-solvent to precipitate the polymer or by distilling off the solvent, but it may be variously selected depending upon the use and object.

The preferable solvents for such a solution polymerization are, for example, basic polar solvents, such as, hexamethylphosphorictriamide, dimethylacetamide, dimethylformamide, dimethylsulfoxide or general organic solvents, such as, benzene, toluene, xylene, chlorobenzene, dichlorobenzene, chloroform, dichloroethane, dichloroethylene, trichloroethane, trichloroethylene, tetrachloroethylene, tetrahydrofuran, n-hexane, cyclohexane and the like. In the present invention, solvents other than the above described solvents or the mixed solvents thereof may be used. If necessary, a hydrogen halide acceptor, such as trimethylamine of triethylamine, can also be used. The particularly preferable solvents for the present invention are chlorobenzene, xylene and hexamethylphosphorictriamide.

The terminal groups of the phosphorus- and bromine-containing polymers obtained in the above described process is not certain but said polymers presumably are ones shown by the following formula (III) which has —O—P—O— bond in the main chain of the polymer molecule.

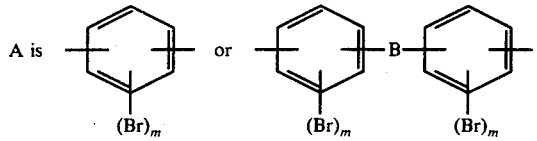
(III)

In the above formula $R_1$ is an alkylene group having 2-3 carbon atoms, $p$ and $q$ are integers of at least 1 and the sum of $p$ and $q$ is not more than 4,

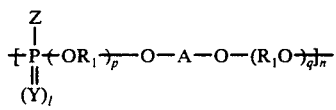

wherein $m$ is an integer of 1-4, B is an alkylene or alkylidene group of 1-6 carbon atoms, or sulfone group, Z is —$R_2$ or —$OR_2$ ($R_2$ is an alkyl or aryl group), Y is S or O and e is 0 or 1.

The polymerization degree of the polymers meaning the average polymerization degree and calculated from the weight average molecular weight measured by GPC and has the general distribution is 3-40 generally 8-20.

The polymer having a low molecular weight wherein n is less than 3, is poor in heat stability, while when n is more than 3, preferably more than 5, the heat stability becomes very high. When the polymerization degree is excessively high, the thermal property and the physical property do not further improve and the viscosity consideribaly increases and the operation becomes difficult, so that less than 40 is preferable.

The bromine-containing compounds used in the present invention are expressed by the following formula.

(I)

In the above formula, $R_1$ is an alkylene group having 2-3 carbon atoms, $p$ and $q$ are a integers of at least 1, the sum of $p$ and $q$ is an integer of not more than 4,

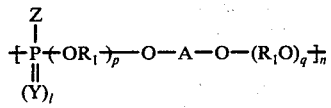

, wherein $m$ is an integer of 1-4 and B is an alkylene or alkylidene group having 1-6 carbon atoms, or sulfone group.

The bromine-containing compounds can be easily obtained by addition reaction of an aromatic diol wherein the nucleus is substituted with bromine, with an epoxide or reacting said aromatic diol with a halogenated alcohol in the presence of an alkaline earth metal.

As the aromatic diols wherein the nucleus is substituted with bromine, use may be made of brominated hydroquinones having the following formula (IV) and brominated bisphenols having the following formula (V).

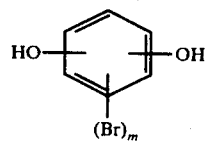
(IV)

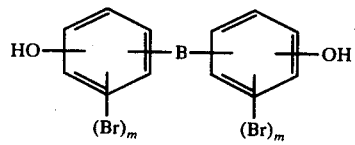
(V)

In the above formula, m is an integer of 1-4 and B is an alkylene or alkylidene group having 1-6 carbon atoms or sulfone group.

The epoxides are, for example α-olefin oxides, such as ethylene oxide and propylene oxide.

The halogenated alcohols are, for example, ethylene chlorohydrin, 3-chloropropanol-1,2-chloroisopropanol-1, epichlorohydrin, ethylene bromohydrin, 3-bromopropanol-1 and the like.

The carbon number of these epoxides or halogenated alcohols is 2-3. When the carbon number is not less than 4, the reactivity lowers, by-products are formed, the physical properties of the resulting phosphorus- and bromine-containing polymers (III) are degraded, the bromine content of the resulting bromine-containing compounds (I) lowers and the thermal property lowers. Among them, ethylene oxide, propylene oxide and ethylene chlorohydrin are preferable for the present invention.

When ethylene oxide is added, $p$ and $q$ of the bromine-containing compounds having the formula (I) can be optionally changed by varying the feeding molar ratio of ethylene oxide based on the aromatic diol wherein the nucleus is substituted with bromine, the kind and the amount of catalyst, but when at least one of $p$ and $q$ is 0, that is the bromine-containing compound is reacted with the phosphorus halide compound in the phenolic hydroxyl form, as mentioned above the physical properties are degraded, so that both $p$ and $q$ must be integers of at least 1. When both $p$ and $q$ are larger than 1 and the sum of $p$ and $q$ is larger than 4, the physical properties of the resulting phosphorus- and bromine-containing polymer of the formula (III) are degraded, so that, such a case is not preferable. The case when both $p$ and $q$ are equal to 1, is preferable.

As the preferable embodiments of the aromatic diols wherein the nucleus is substituted with bromine, which are shown by the above formulae (IV) and (V), mention may be made of brominated hydroquinones, such as, 2-bromohydroquinone, 2,5-dibromohydroquinone, 2,3-dibromohydroquinone, 2,6-dibromohydroquinone, 2,3,5-tribromohydroquinone, 2,3,5,6-tetrabromohydroquinone, 2-bromoresorcin, 6-bromoresorcin, 5-bromoresorcin, 2,6-dibromoresorcin, 2,4,6-tribromoresorcin, 2,4,5-tribromoresorcin, 2,4,5,6-tetrabromoresorcin; brominated bisphenols, such as, 4,4'-methylene-bis(2-bromophenol), 4,4'-methylene-bis(2,6-dibromophenol), 3,3'-ethylenebis(2,6-dibromophenol), 4,4'-isopropylidene-bis(2-bromophenol), 4,4'-isopropylidene-bis(2,6-dibromophenol), 3,3'-isopropylidene-bis(dibromophenol), 4,4'-isopropylidene-bis(2,3,6-tribromophenol), 4,4'-isopropylidene-bis(2,3,5,6-tetrabromophenol), 4,4'-sulfone-bis(2,6-dibromophenol), 3,3'-sulfone-bis(2,3,6-tribromophenol) and the like.

In the aromatic diols wherein the nucleus is substituted with bromine, it is desirable that at least one bromine is substituted on the ortho-position of the aromatic hydroxyl group. When 3 or more bromines are substituted on one nucleus, the bromine substituted on the position other than ortho-position is more thermally unstable than the bromine substituted on the ortho-position but if the reaction is effected at a temperature of lower than 180° C, the stable state can be maintained.

The phosphorus halide compounds used in the present invention are shown by the following formula.

In the above formula, Z is -$R_2$ or -$OR_2$ ($R_2$ is an alkyl or an aryl group), X is chlorine or bromine, Y is sulfur or oxygen and l is 0 or 1. Said phosphorus halide compounds are, for example, phenyldichlorophosphine, phenyldichlorophosphine oxide, phenyldichlorophosphine sulfide, phenyldibromophosphine, phenyldibromophosphine oxide, 3-methylphenyldichlorophosphine, 3-methylphenyldichlorophosphine oxide, 3,5-dimethylphenyldichlorophosphine oxide, 3,5-dimethylphenyldichlorophosphine sulfide, 3,5-dimethylphenyldibromophosphine oxide, 3-bromophenyldichlorophosphine oxide, methyldichlorophosphine methyldichlorophosphine oxide, methyldichlorophosphine sulfide, ethyldichlorophosphine oxide, ethyldibromophosphine oxide, n-propyldichlorophosphine oxide, isopropyldichlorophosphine oxide, isopropyldichlorophospine, phenoxydichlorophosphine, phenoxydichlorophosphine oxide, phenoxydichlorophosphine sulfide, 3-methylphenoxydichlorophosphine oxide, 2-methylphenoxydichlorophosphine oxide, 2,5-dimethylphenoxydichlorophosphine oxide, nonylphenoxydichlorophosphine oxide, methoxydichlorophosphine oxide, ethoxydichlorophosphine oxide, ethoxydibromophosphine oxide, ethoxydichlorophosphine sulfide, n-propoxydichlorophosphine oxide, n-propoxydichlorophosphine, isopropoxydichlorophosphine oxide, butoxydichlorophosphine oxide and the like but the phosphorus halide compounds are not limited thereto. When the carbon number of $R_2$ in the formula (II) is too large, the content of phosphorus and bromine elements in the resulting phosphorus- and bromine-containing polymer lowers and the activity as the flame retardant is decreased, so that the carbon number is preferred to be not more than 15, preferably not more than 8.

When $R_2$ is an aryl group, the heat stability is superior to that when $R_2$ is an alkyl group and even when $R_2$ is an aryl group, —$R_2$ is superior in the thermal property to —$OR_2$ in which $R_2$ bonds to phosphorus through oxygen. Y in the general formula (II) is sulfur or oxygen atom and phosphorus may be pentavalent or trivalent and in view of the heat stability, pentavalent phosphorus is superior and among pentavalent phosphorus, the bond to oxygen is preferable. Accordingly, the most preferable phosphorus halide compounds are phenyldichlorophosphine oxide, phenyldibromophosphine oxide and phenoxyphosphine oxide. Upon the polymerization of the phosphorus- and bromine-containing linear polymers according to the present invention, if necessary, a small amount of antimony trioxide, light resistant agent, heat resistant agent, antioxidant, delustering agent, organic tin color preventing agent or assistant may be compounded.

The thus obtained phosphorus- and bromine-containing polymers are compounded in inflammable organic high polymers in an amount of 3–30% by weight, preferably 5–15% by weight. When the phosphorus- and bromine-containing polymer is less than 3% by weight, such an amount is insufficient to fully develop the flame retarding activity and when said amount exceeds 30% by weight, the flame retarding activity does not further improve and various excellent properties of the polyester and the other inflammable organic high polymers are degraded, so that the use of such a large amount should be avoided.

The inflammable organic high polymers capable of being rendered flame resistant by compounding the phosphorus- and bromine-containing polymers according to the present invention are polyesters, such as polyethylene terephthalate, polybutylene terephthalate, polyethylene naphthalate, polyoxybenzoate, etc.; polyacryls, such as polyacrylonitrile, polymethacrylate, etc.; polyamides, such as 4-nylon, 6-nylon, 66-nylon, 12-nylon, 610-nylon, etc.; polyolefins, such as polyethylene, polypropylene, polystyrene, etc.; polyurethane; these copolymers modified by a small amount of modifier; and celluloses.

Methods for compounding the above described phosphorus- and bromine-containing polymer in the above described inflammable organic high polymers vary depending upon the kind of the inflammable organic high polymer but said phosphorus- and bromine-containing compound may be added before or after the polymerization. For example, after the polymerization, the phosphorus- and bromine-containing polymer is added to the polymerization vessel and then a molding is carried out. Alternatively, the inflammable organic high polymer is once molded into chips or powder or is dissolved in a solvent, and then mixed with the phosphorus- and bromine-containing polymer and the resulting mixture is molded. In the other process, a large amount of phosphorus- and bromine-containing polymer is compounded in the inflammable organic high polymer and then diluted to a desired compounding amount, after which the mixture is spun. As the mixers, use may be made of an autoclave provided with stirring blades, super mixer, Henschel mixer, kneader and the like.

The flame resistant compositions according to the present invention may contain pigment, dyestuff, antistatic agent, moisture absorbing agent, light resistant agent, heat stablizer, antioxidant, fluorescent agent, carbon black, delusterant, such as titanium oxide and zinc oxide, flame retarding assistant, such as antimony or phosphorus compound.

As mentioned above, the flame resistant composition of the present invention can be commercially easily molded without sublimating and scattering the flame retardant when said composition is molded into fibers or films and the obtained fibers or films have a very high whiteness and excellent washing resistance, light resistance and a high flame resistance and are commercially useful.

In general, the composition containing a halogen compound is poor in the light resistance but even though the composition according to the present invention contains halogen, the composition is surprisingly excellent in the light resistance. The reason for this is not clear but the flame retardant has no heat hysteresis and can be obtained by the polycondensation at a low temperature, so that the splitting of halogen is not caused and the yellowing due to light does not occur.

The following examples are given for the purpose of illustration of this invention and are not intended as limitations thereof.

In the examples, "parts" and "%" mean by weight unless otherwise indicated.

The thermal decomposition temperature (Dt) of a polymer was measured by means of a thermobalance under a condition that the temperature of the polymer was raised at a constant rate of 10° C/min.

The elementary analysis of the polymer was carried out according to ordinary chemical analysis and instrumental analysis.

The molecular weight of the polymer is shown by the average polymerization degree (n), which was calculated from the weight average molecular weight of the polymer measured by using a solution of the polymer in tetrahydrofuran by means of G.P.C.

The coloration of the polymer is shown by the APHA color of a solution of 50 g of the polymer in 500 cc of dimethylacetamide.

The flame resistance of the flame-resistant composition was evaluated by the limiting oxygen index (LOI) of the composition measured according to JIS K7201-1972 and by the number of contacted times of the composition with flame (hereinafter, referred to as "number of flame-contact times") measured according to the 45° inclined coil method of JIS L1091-1970.

The light resistance of the flame-resistant composition was evaluted as follows. A sample of the composition is irradiated with a fadeometer for 40 hours, and the discoloration degree of the sample is compared with the discoloration degree standard of the fadeometer. In the standard, the most significantly discolored standard piece is the 1st grade and non-discolored standard piece is the 5th grade.

The washing condition of the flame-resistant composition is as follows. Water washing is carried out according to JIS L1042, 6.2 method. Dry cleaning is carried out according to JIS L1018, 5.36.2, E-2 method.

The following Comparative Example 1 shows an embodiment wherein the dihydroxyl group of bromine-containing compound is not an alcoholic hydroxyl group according to the present invention but is phenolic hydroxyl group. The phosphorus- and bromine-containing polymer produced by the reaction of the bromine-containing compound having phenolic hydroxyl group with the phosphorus halide compound of the formula (II) is inferior to the phosphorus- and bromine-containing polymer of the present invention in the property of the final product when the polymer is mixed with polyamide and the resulting mixture is melted and molded into a molded article.

Comparative Example 1

Into a glass reaction vessel were charged 54.4 parts of 4,4'-isopropylidene-bis(2,6-dibromophenol), 20.0 parts of phenyldichlorophosphine oxide and 0.10 part of zinc chloride.

The resulting mixture was heated at 180° C for 20 hours under atmospheric pressure in nitrogen atmosphere while stirring. A part of the reaction product was taken out from the vessel and analyzed. The analysis showed that 40–50% of unreacted monomers still remained. The reaction was further continued at 220° C for 5 hours under atmospheric pressure, and then at 240° C for 2 hours under a reduced pressure of 5 mmHg to obtain a dark brown resinous polymer having a melting point of 215° C. Elementary analysis values and physical properties of the polymer were as follows. Dt: 204° C, Br: 46.7%, P: 4.8%, C: 38.7%, H: 2.3%, APHA: 150, polymerization degree: 3, molecular weight: 1,920. It can be seen from the above obtained results that the resinous polymer was a colored polymer having poor thermal property. This polymer is referred to as "flame retardant B" hereinafter.

When 10 parts of the polymer was mixed with 90 parts of powdery nylon-12 and the resulting mixture was melted and molded at 250° C, the mixture colored deep brown and foamed, and moreover the compatibility of the polymer with nylon-12 was poor. Therefore, it was impossible to produce a satisfactory molded article.

The following Comparative Example 2 shows an embodiment, wherein although the dihydroxyl group of bromine-containing compound is an alcoholic hydroxyl group, the group "A" in the formula (I) is not a bromine-substituted phenyl group but rather is an alkyl group.

Comparative Example 2

Into a reaction vessel were charged 26.2 parts of dibromoneopenthylene glycol and 20.0 parts of phenyldichlorophosphine oxide, and the resulting mixture was heated, under nitrogen atmosphere while stirring, at 120° C for 1 hour under atmospheric pressure and then for 30 minutes under a reduced pressure of 5 mmHg to obtain a dark brown liquid polymer, which was viscous at room temperature. Elementary analysis values and physical properties of the polymer were as follows. Dt: 180° C, Br: 40.7%, P: 8.7%, C: 34.9%, H: 3.3%, APHA: 130, polymerization degree: 3.2, molecular weight: 1,200. This polymer is referred to as "flame retardant C" hereinafter.

To 90 parts of powdery polyethylene terephthalate was added 10 parts of the above obtained polymer, and the resulting mixture was melt spun. However, the polymer was decomposed significantly and filamentary product was not obtained due to the decrease of viscosity of the mixture.

The following Comparative Example 3 shows an embodiment, wherein a phosphorus- and bromine-containing polymer has a structure similar to that of the phosphorus- and bromine-containing polymer (formula III) of the present invention but the group "Z" is a haloalkoxy group, the alkyl group of which is bonded to the phosphorus atom through an oxygen atom. Such polymer is inferior to the phosphorus- and bromine-containing polymer of the present invention in the physical properties of the polymer itself and in the physical properties of molded article produced by melting and molding a mixture of the polymer with polyamide.

Comparative Example 3

Into a reaction vessel were charged 63.2 parts of 2,2-bis[3,5-dibromo-4-(2-hydroxyethoxy)phenyl]propane and 23.9 parts of 2-bromoethoxydichlorophosphine oxide, and the resulting mixture was heated at 130° C for 0.5 hour under atmospheric pressure and further for 0.5 hour under a reduced pressure of 5 mmHg in nitrogen atmosphere while stirring. The reaction product was a transparent brown resinous polymer having a melting point of 52° C. The polymer had a Dt of 208° C and was very poor in the heat resistance. Elementary analysis of the polymer showed that Br: 49.3%, P: 4.02%, C: 32.6% and H: 2.88%. This result agrees substantially with the theoretical values of Br: 50.9%, P: 3.95%, C: 32.1% and H: 2.81%. The polymer had a molecular weight of 5,000, a polymerization degree of 6 and an APHA of 150, and was a significantly colored polymer. This polymer was referred to as "flame retardant D" hereinafter.

When 10 parts of the polymer and 90 parts of powdery nylon-12 were mixed similar to Comparative Example 1, and the resulting mixture was melted and molded at 250° C, the resulting molded article colored significantly and was brittle.

EXAMPLE 1

Into a reaction vessel were charged 63.2 parts of 2,2-bis[3,5-dibromo-4-(2-hydroxyethoxy)phenyl]propane and 20 parts of phenyldichlorophosphine oxide, and the resulting mixture was heated, under nitrogen atmosphere while stirring, at 130° C for 0.5 hour under atmospheric pressure and then for 0.5 hour under a reduced pressure of 5 mmHg to obtain a colorless transparent resinous polymer having a melting point of 98° C. The polymer had a Dt of 344° C and was excellent in the heat resistance. The elementary analysis values of the polymer were Br: 42.7%, P: 4.15%, C: 39.5%, H: 3.09%, and agreed completely with the theoretical values of Br: 42.4%, P: 4.12%, C: 39.8%, H: 3.05%. Further, the polymer had a polymerization degree of 10, a molecular weight of 8,000 and an APHA of 10. Therefore, the polymer was colorless and was excellent in the heat resistance. Hereinafter, this polymer is referred to as "flame retardant A".

When 10 parts of the polymer and 90 parts of powdery nylon-12 were mixed similar to Comparative Example 1, and the resulting mixture was melt spun at 260° C, the spinning and drawing were able to be effected smoothly, and filaments having an excellent whiteness were obtained. When the filaments were ignited and the fire source was removed, the filaments were extinguished immediately and had an excellent self-extinguishing property.

EXAMPLE 2

The reaction of Example 1 was repeated, except that the reaction condition was varied as described in the following Table 1. Physical properties and elementary analysis values of the resulting polymer are shown in Table 1 together with the reaction condition.

As seen from Table 1, when the reaction temperature exceeds 180° C (Experiment Nos. 1 and 2), the resulting polymer is discolored and decomposed and is poor in the physical property. While, the polymers (Experiment Nos. 3-9) obtained by the method of the present invention had excellent physical properties. Further, it can be seen from a series of reactions (Experiment Nos. 5-9), wherein the reaction temperature is kept constant and the reaction time is varied, that the aimed polymer of the present invention can be obtained in a short period of time.

Table 1

| Experiment No. | Reaction condition Temp. (° C) | Time (min.) | Physical property polymerization degree | Melting Point (° C) | Dt (° C) | APHA | Elementary analysis value Br (%) | P (%) | Remarks |
|---|---|---|---|---|---|---|---|---|---|
| 1 | 220 | 30 | 2.5 | 92 | 267 | 100 | 41.5 | 4.60 | Outside the present invention |
| 2 | 200 | 30 | 3.0 | 94 | 280 | 80 | 42.0 | 4.59 | " |
| 3 | 180 | 30 | 5.5 | 98 | 331 | 35 | 42.8 | 4.31 | Present invention |
| 4 | 150 | 30 | 7.0 | 98 | 344 | 10 | 42.6 | 4.35 | " |
| 5 | 120 | 60 | 8.0 | 100 | 343 | 8 | 42.7 | 4.32 | " |
| 6 | 120 | 120 | 8.0 | 100 | 344 | 8 | 42.5 | 4.31 | " |
| 7 | 120 | 240 | 7.5 | 100 | 344 | 10 | 42.8 | 4.33 | " |
| 8 | 120 | 30 | 7.5 | 100 | 341 | 8 | 42.6 | 4.35 | " |
| 9 | 120 | 10 | 7.0 | 100 | 340 | 6 | 42.8 | 4.32 | " |

EXAMPLE 3

In 400 g of hexamethylphosphoric triamide was dissolved 0.5 mole of a bromine-containing compound shown in the following Table 2, and 0.5 mole of a phosphorus halide compound shown in Table 2 was added dropwise to the solution in about 20 minutes at room temperature under nitrogen atmosphere while stirring. In this case, since the reaction is an exotherimic reaction, the reaction vessel was cooled from the outside to keep the inner temperature below 50° C. After completion of the addition, the reaction was continued for 1 hour at the same temperature, and further continued for 45 minutes at an inner temperature of 80° C. Then, hexamethylphosphoric triamide was added to the reaction system so that the viscosity of the system was about 50 poises at room temperature, and then the resulting mass was poured into a large amount of a 50% aqueous solution of isopropyl alcohol to coagulate the reaction product. The reaction product was filtered, washed thoroughly with water and dried at a temperature of not higher than 50° C under reduced pressure to obtain powdery white crystals. Physical properties of the resulting polymers are shown in TAble 2. It can be seen from Table 2 that all of the resulting polymers have excellent physical properties.

When a mixture of 15 parts of the polymer and 85 parts of polyethylene terephthalate or polypropylene was melted and molded the resulting molded article was colorless and transparent, and even when the molded article was ignited, if the fire source was removed, the article was extinguished by itself.

EXAMPLE 4

One mole of 4,4'-sulfone-bis(2,6-dibromophenol) was reacted with a variant mole of ethylene oxide to prepare bromine-containing compounds which are different

| Experiment No. | Flame retardant | Starting material Bromine-containing compound | Phosphorus halide compound | Phosphorus- and bromine-containing polymer | | | | | |
|---|---|---|---|---|---|---|---|---|---|
| | | | | Physical property | | | | Elementary analysis value | |
| | | | | Polymerization degree | Melting point (°C) | Dt (°C) | APHA | Found value (calculated value) | |
| | | | | | | | | Br (%) | P (%) |
| 10 | E | 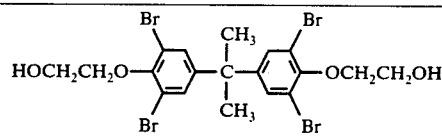 | 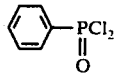 | 28 | 103 | 348 | 6 | 42.6 (42.4) | 4.16 (4.12) |
| 11 | F | " | 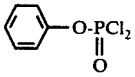 | 26 | 100 | 303 | 10 | 41.4 (41.6) | 4.09 (4.03) |
| 12 | G | " | 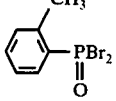 | 20 | 97 | 330 | 10 | 42.1 (41.7) | 4.06 (4.03) |
| 13 | H | 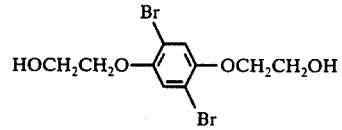 | 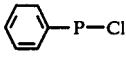 | 18 | 72 | 287 | 18 | 35.1 (35.4) | 3.93 (3.87) |
| 14 | I | 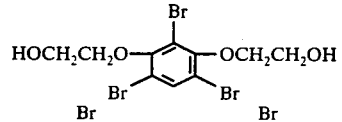 | 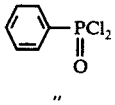 | 15 | 79 | 313 | 12 | 45.1 (45.7) | 5.84 (5.90) |
| 15 | J | 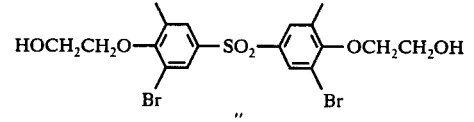 | " | 16 | 122 | 341 | 10 | 41.6 (41.2) | 3.97 (4.00) |
| 16 | K | " | 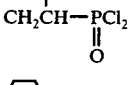 | 10 | 91 | 296 | 25 | 43.8 (43.2) | 4.22 (4.18) |
| 17 | L | " | 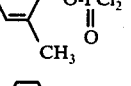 | 16 | 96 | 310 | 20 | 39.2 (39.8) | 3.91 (3.86) |
| 18 | M | 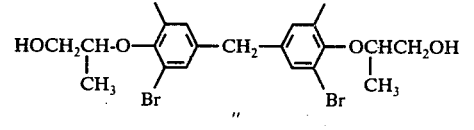 | 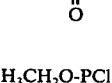 | 15 | 100 | 322 | 10 | 43.1 (42.7) | 4.10 (4.12) |
| 19 | N | " | $CH_3CH_2O\text{-}PCl_2$ ‖ O | 8 | 61 | 293 | 30 | 47.1 (47.9) | 4.06 (4.18) |
| 20 | O | 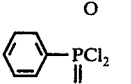 | 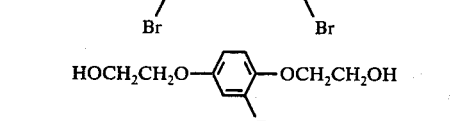 | 12 | 86 | 287 | 25 | 42.1 (42.3) | 4.13 (4.10) |
| 21 | P | 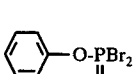 | 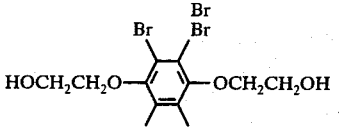 | 6 | 116 | 290 | 35 | 32.0 (32.3) | 6.22 (6.27) |
| 22 | Q | 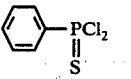 | 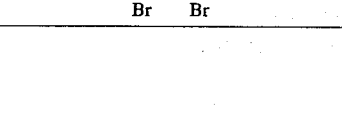 | 10 | 78 | 289 | 25 | 48.8 (49.2) | 4.77 (4.76) | from each other in the numbers of p and q as shown in the following Table 3. 0.5 mole of the resulting bromine-containing compound was charged into a reaction vessel together with 200 cc of xylene, and the resulting mixture was heated at 130° C while stirring to prepare a homogeneous solution, and then 0.505 mole of phenyldichlorophosphine oxide was added dropwise to the solution in about 20 minutes. Generated hydrogen chloride gas was passed through a cooling tube and then absorbed in an NaOH aqueous solution. After completion of the addition, the reaction was further continued at 130° C for 1 hour under atmospheric pressure, and then xylene was distilled off initially under a slightly reduced pressure and subsequently completely distilled off at 130° C under a highly reduced pressure of 5 mmHg. The reaction mixture was cooled to obtain a resinous polymer. Properties of the resulting resinous polymers are shown in Table 3.

As seen from Table 3, when the value of $p+q$ is an integer of less than 2 (Experiment No. 23) or an integer of more than 4 (Experiment No. 27), the polymer is colored and is poor in the physical property. When the values of $p$ and $q$ are integers of not less than 1 respectively, and the value of $p+q$ is not more than 4 (Experiment Nos. 24–26), the polymer is substantially colorless and has excellent physical properties.

Table 3

| Experiment No. | p + q | Polymerization degree | Melting point (° C) | Dt (° C) | APHA | Br (%) | P (%) | Remarks |
| --- | --- | --- | --- | --- | --- | --- | --- | --- |
| 23 | 1.5 | 4.5 | 128~137 | 270 | 100 | 44.9 | 4.23 | outside the present invention |
| 24 | 2.0 | 18 | 120 | 310 | 10 | 41.9 | 4.06 | present invention |
| 25 | 3.2 | 20 | 112 | 300 | 15 | 40.6 | 3.93 | " |
| 26 | 4.0 | 12 | 100 | 287 | 30 | 37.5 | 3.63 | " |
| 27 | 5.0 | 10 | 82 | 241 | 55 | 36.5 | 3.50 | outside the present invention |

A mixture of 10 parts of the phosphorus- and bromine-containing polymer shown in Table 3 and 90 parts of polyethylene terephthalate was melt spun at 280° C. Table 4 shows the result. As seen from Table 4, in Experiment No. 23', the mixture was significantly colored and decomposed, and the spinning was impossible. In Experiment No. 27' wherein a polymer having a very poor thermal property was used, the viscosity of the mixture was significantly decreased, and yarn breakage occurred very often in the spinning, and the spinnability was poor. While, in Experiment Nos. 24'–26' according to the present invention, the spinning was carried out smoothly and the resulting filament was excellent in the whiteness and light resistance.

Table 4

| Experiment No. | Spinnability | Coloration | Drawing | Yarn property (strength) (g/d) | Flame resistance |
| --- | --- | --- | --- | --- | --- |
| 23' | poor | deep dark brown | — | — | — |
| 24' | excellent | white | excellent | 4.3 | self-extinguishable |
| 25' | excellent | " | excellent | 4.0 | " |
| 26' | yarn breakage occurs, but spinnability is good | slightly yellowish brown | somewhat poor | 3.8 | " |
| 27' | yarn breakage occurs often, and spinnability is poor | brown | poor | 2.7 | " |

EXAMPLE 5

63.2 parts of 2,2-bis[3,5-dibromo-4-(2-hydroxyethoxy)phenyl]propane and 21.3 parts of phenoxydichlorophosphine oxide were reacted in various solvents under the condition shown in the following Table 5. Physical properties of the resulting phosphorus- and bromine-containing polymers are shown in Table 5 together with the reaction condition.

Table 5

| Experiment No. | Solvent Name | Solvent Amount (part) | Reaction condition Temp. (° C) | Reaction condition Time (hr.) | Molecular weight | Melting point (° C) | D+ (° C) | APHA |
| --- | --- | --- | --- | --- | --- | --- | --- | --- |
| 28 | Dimethyl- | 200 | 50–80 | 3 | 16,000 | 106 | 312 | 15 |
| 29 | Xylene | 50 | 140 | 1 | 11,000 | 105 | 311 | 10 |
| 30 | 1,1,2,2-Tetrachloroethane | 150 | 135 | 1.5 | 9,000 | 105 | 312 | 15 |
| 31 | Monochlorobenzene | 100 | 125 | 0.5 | 10,000 | 106 | 312 | 10 |
| 32 | Tetrahydro- | 200 | 120 | 3.5 | 10,000 | 105 | 311 | 8 |

Table 5-continued

| Experiment No. | Solvent Name | Solvent Amount (part) | Reaction condition Temp. (°C) | Reaction condition Time (hr.) | Molecular weight | Melting point (°C) | D+ (°C) | APHA |
| --- | --- | --- | --- | --- | --- | --- | --- | --- |
| | furan + xylene | | | | | | | |

The resulting phosphorus- and bromine-containing polymer was added to a reaction solution of an acrylonitrile series polymer, which was prepared by polymerizing a mixture of acrylonitrile/vinylidene chloride/sodium allylsulfonate=89/10/1 at 80° C in dimethylformamide, the amount of the phosphorus- and bromine-containing polymer being 15 parts and that of the acrylonitrile series polymer being 85 parts, to prepare a homogeneous solution. Then, the concentration of the mixture of the phosphorus- and bromine-containing polymer and the acrylonitrile series polymer in the dimethylformamide solution was adjusted to 25%, and the resulting spinning solution was extruded into a dimethylformamide-water coagulation bath and coagulated therein. The resulting undrawn filament was drawn in hot water and in steam to obtain an acrylic filament. The resulting acrylic filament was excellent in the whiteness and gloss. Even when the filament was ignited, if the fire source was removed, the filament was immediately extinguished by itself. Even after water washing and dry cleaning were repeated 5 times, the filament had a self-extinguishing property, similarly.

undrawn filaments were hot drawn to obtain a multifilament of 75 d/24 f.

In the same manner as described above, flame retardants B and D prepared in Comparative Examples 1 and 3 were used and multifilaments of 75 d/24 f were produced, respectively.

The following Table 6 shows the whiteness, light resistance, yarn properties and flame resistance of the resulting filaments.

Table 6

| Experiment No. | Flame retardant | Yarn property strength (g/d) | Yarn property Elongation (%) | Yarn property Young's modulus (g/d) | Whiteness L-value | Whiteness b-value | Light resistance (grade) | Flame resistance Number of flame-contact times | LOI |
| --- | --- | --- | --- | --- | --- | --- | --- | --- | --- |
| 33 | A | 4.12 | 29.3 | 103 | 81 | 3 | 4–5 | 5.3 | 27.5 |
| 34 | B | 3.80 | 27.9 | 86 | 53 | 15 | 1–2 | 4.6 | 27.0 |
| 35 | D | 3.06 | 18.1 | 83 | 70 | 20 | 1–2 | 4.5 | 27.0 |

As seen from Table 6, the filament (Experiment No. 33) of the present invention is very high in the whiteness and is excellent in the flame resistance and light resistance.

EXAMPLE 7

A variant amount of flame retardant A prepared in Example 1 was mixed with the same polyethylene terephthalate as used in Example 6, and the resulting mixture was melt spun in the same manner as described in Example 6. The content of the flame retardant, and the spinnability, yarn property and flame resistance of the resulting filament are shown in the following Table 7.

Table 7

| Experiment No. | Content of flame retardant A (%) | Spinnability | Yarn Property Strength (g/d) | Yarn Property Elongation (%) | Flame resistence Number of flame-contact times | Remarks |
| --- | --- | --- | --- | --- | --- | --- |
| 36 | 0 | Excellent | 4.65 | 28.3 | 1.1 | Blank |
| 37 | 2 | " | 4.21 | 29.8 | 2.3 | Outside the present invention |
| 38 | 4 | " | 4.26 | 27.9 | 3.8 | present invention |
| 39 | 9 | " | 4.10 | 29.9 | 4.8 | " |
| 40 | 15 | " | 4.01 | 27.8 | 5.6 | " |
| 41 | 18 | " | 3.97 | 24.1 | 5.9 | " |
| 42 | 25 | Yarn breakage occurs slightly in monofilamnet | 3.41 | 25.3 | 6.0 | " |
| 43 | 32 | Yarn breakage occurs often | 2.82 | 21.9 | 5.8 | Outside the present invention |

EXAMPLE 6

Flame retardant A produced in Example 1 was crushed into granules having a grain size of about 8 meshes. 10 parts of the granules and 90 parts of chips of polyethylene terephthalate having a water content of 0.006% and having an intrinsic viscosity of 0.69 (viscosity was measured by means of the Ostwald viscosimeter by using a 1% solution in a mixed solvent of phenol/tetrachloroethane=6/4) were mixed, and the resulting mixture was melt spun by means of an extruder kept at 290° C under nitrogen atmosphere, and the extruded As seen from Table 7, when the content of the flame retardant is less than 3% (Experiment No. 38), the resulting filament is poor in the flame resistance. While, when the content is more than 30% (Experiment No. 43), the resulting filament has satisfactorily high flame resistance, but the spinnability and yarn property of the filament are decreased due to the excess content of the flame retardant. When the content of the flame retardant is within the range of the present invention (Experiment Nos. 38–42), the resulting filament has excellent flame resistance and yarn property.

EXAMPLE 8

A mixture of 12 parts of each of flame retardant E-K produced in Example 3 and 88 parts of polyethylene terephthalate was melt spun in the same manner as described in Example 6 to prepare a multifilament of 75 d/32 f. All of the resulting multifilaments were excellent in the flame resistance, whiteness and light resistance as shown in the following Table 8.

Table 8

| Experiment No. | Flame retardant | Whiteness L-value | Whiteness b-value | Light resistance (grade) | Flame resistance Number of flame-contact times | LOI |
|---|---|---|---|---|---|---|
| 44 | E | 86 | 3 | 5-4 | 5.9 | 28.2 |
| 45 | F | 82 | 3 | 4 | 5.2 | 27.6 |
| 46 | G | 83 | 4 | 5-4 | 5.6 | 28.0 |
| 47 | H | 80 | 4 | 4 | 4.8 | 27.0 |
| 48 | I | 80 | 6 | 4 | 6.3 | 28.5 |
| 49 | J | 82 | 3 | 5-4 | 5.6 | 28.6 |
| 50 | K | 80 | 6 | 4 | 5.0 | 27.5 |

EXAMPLE 9

The filaments of Experiment No. 33 in Example 6 were doubled, and the resulting yarn was knitted into a tubular knitted tricot fabric. After the tricot fabric was subjected to water washing and dry cleaning, the flame resistance of the fabric was measured. The obtained results are shown in the following Table 9.

The flame resistance of the tricot fabric was measured as follows. A sample fabric having a length of 10 cm and a weight of 1 g is cut out from a tricot fabric. The sample fabric is wound around a stainless wire having a diameter of 0.5 mm and inserted into a coil, and the number of flame contact times of the sample in the 45° inclined coil method is measured.

Table 9

| | Number of washing times | | Flame resistance (number of flame-contact times) |
|---|---|---|---|
| | before washing | — | 5.6 |
| Tubular knitted tricot fabric | washing with water | after 20 times | 5.4 |
| | | after 50 times | 5.6 |
| | dry cleaning | after 5 times | 5.5 |
| | | after 10 times | 5.3 |
| | | after 20 times | 5.6 |
| | | after 50 times | 5.1 |

As seen from Table 9, the tricot fabric has a very high resistance against washing.

EXAMPLE 10

The phosphorus- and bromine-containing polymer obtained in Experiment No. 28 of Example 5 was heated and melted at 150° C and formed into pellets having a hemispherical shape of 3 mm diameter by means of a granulator. The pellets were mixed with chips of a thermoplastic organic high polymer shown in the following Table 10 in a mixing ratio shown in Table 10, and the resulting mixture was melted in an extruder and extruded therefrom to form a gut having a diameter of 6 mm. The gut was cut into a length of 10 cm and the LOI of the gut was measured. The obtained results are shown in Table 10. All of the resulting guts has excellent whiteness and flame resistance.

Table 10

| Experiment No. | Phosphorus- and bromine-containing polymer Amount (part) | Thermoplastic organic high polymer Kind | Thermoplastic organic high polymer Amount (part) | LOI |
|---|---|---|---|---|
| 51 | 10 | nylon-6 | 90 | 30.5 |
| 52 | 10 | nylon-66 | 90 | 30.0 |
| 53 | 12 | Polystyrene | 88 | 31.0 |
| 54 | 10 | Polyethylene | 90 | 31.5 |
| 55 | 12 | Polyurethane | 80 | 32.0 |

EXAMPLE 11

In 200 parts of dimethylformamide was dissolved 10 parts of the phosphorus- and bromine-containing polymer produced in Experiment No. 29 of Example 5, and the resulting solution was charged into a kneader. Then, 54 parts of acrylonitrile, 8 parts of methyl acrylate and 2 parts of sodium allylsulfonate and further 0.6 part of azobisisobutyronitrile as a catalyst were charged to the kneader, and the resulting mixture was reacted at 80° C for about 15 hours under nitrogen atmosphere. After unreacted monomers were removed under reduced pressure, the viscosity of the reaction mixture was adjusted to 8,000 centipoises to prepare a spinning solution. In this reaction, the polymerization yield was about 50%. The spinning solution was extruded into a 60% aqueous solution of dimethylformamide through a spinneret of 0.07mm$\phi \times$40holes while metering by means of a gear pump and coagulated in the solution. The undrawn filament was drawn to about 8 times its original length in hot water and in steam to obtain an acrylic filament having excellent whiteness and gloss.

When the flame resistance of the resulting acrylic filament was measured by the 45° inclined coil method, the number of flame-contact times was found to be 4 times, and the filament had an excellent flame-resistance. Further, the filament had an excellent light resistance of 4–5th grade.

EXAMPLE 12

Into 75 parts of viscose containing 7.0% of cellulose, 6.0% of total alkali and 0.01% of polyoxyethylene butyl ether (ethylene oxide: 10 moles) and having a viscosity of 80 seconds (dropping speed of steel ball) and a salt point of 6.0 was injected 25 parts of a mixture consisting of 100 parts of the phosphorus- and bromine-containing polymer prepared in Experiment No. 30 of Example 5, 20 parts of laurylamine-ethylene oxide adduct (ethylene oxide: 7 moles) and 20 parts of carbon tetrachloride to prepare a viscose spinning solution. The viscose spinning solution was extruded into a coagulation bath containing sulfuric acid in a concentration of 75 g/l and zinc sulfate in a concentration of 50 g/l, having a specific gravity of 1.200 and kept at 40° C, through orifices, and the extruded undrawn filaments were drawn to 1.6 times their original length in a second bath containing sulfuric acid in a concentration of 45 g/l and kept at 80° C. The drawn filaments were cut, scoured and dried to obtain rayon staples. The rayon staples were spun into a 30 count fine spun yarn. Yarn properties, flame resistance and light resistance of the spun yarn, and percentage of the amount of the flame resistant remaining in the spun yarn based on the originally added amount (hereinafter referred to as "remaining percentage of flame resistant") before and after the washing the spun yarn are shown in the following Table 11.

Table 11

| Experiment No. | | Strength (g/d) | Elongation (%) | LOI | Light resistance (grade) | Remaining percentage of flame resistant (%) |
|---|---|---|---|---|---|---|
| 56 | Before washing | 2.22 | 17.6 | 27.0 | 4–5 | 96.7 |
| 57 | After washing | 2.20 | 17.8 | 27.0 | 4–5 | 96.0 |

The washing condition in the above experiment was as follows. A sample yarn is washed in a 0.3% aqueous solution of neutral detergent kept at 50° C for 20 minutes in a bath ratio of 100:1, and washed with water for 20 minutes. This procedure is repeated 20 times.

As seen from Table 11, the spun yarn had remarkably excellent yarn property, light resistance, flame resistance and resistance against washing.

EXAMPLE 13

In 100 parts of polyether polyol for rigid foam (trademark PPG-SU-450L, made by Mitsui Toatsu Chemical Co.) was dissolved 15 parts of each of flame retardants K, L and M produced in Experiment Nos. 16, 17 and 18 of Example 3, and 1.0 part of silicone oil as a stabilizer, 1.2 parts of a 33% solution of triethylenediamine in dipropylene glycol and 1.2 parts of N,N′-dimethylethanolamine as a catalyst and 35 parts of trifluoromethane as a foaming agent were added to the solution. The resulting mixture was thoroughly mixed and then 114 parts of diphenylmethane diisocyanate was added to the mixture, and the resulting mass was thoroughly stirred for 20 seconds and foamed to obtain a rigid polyurethane foam. Flame resistance of the resulting polyurethane foam was measured according to ASTM D1692-1968. The following Table 12 shows the result. As seen from Table 12, the resulting rigid polyurethane foams had an excellent flame resistance.

Table 12

| Experiment No. | Flame retardant | Burning distance (cm) | Burning time (sec.) | Estimation |
|---|---|---|---|---|
| 58 | K | 1.5 | 21 | SE |
| 59 | L | 1.7 | 19 | SE |
| 60 | M | 1.6 | 18 | SE |

EXAMPLE 14

To 100 parts of a 25% solution of polyurethane (trademark Crisvron 8166, made by Dainippon Ink Co.) in dimethylformamide were added 10 parts of a 50% solution of flame retardant N, which was produced in Experiment No. 19 of Example 3, in dimethylformamide and a small amount of pigment, and the resulting solution was coated on one surface of a blended yarn non-woven fabric composed of 60 parts of rayon and 40 parts of polyethylene terephthalate and having a thickness of 0.8 mm, and the fabric was immersed in water to coagulte the polyurethane coating layer, thereby an artificial leather having a thickness of 1.5 mm was produced. The artificial leather had an excellent light resistance and an excellent flame resistance which was estimated as self-extinguishable (SE) by ASTM D1692-1968.

What is claimed is:

1. A polymer having the formula

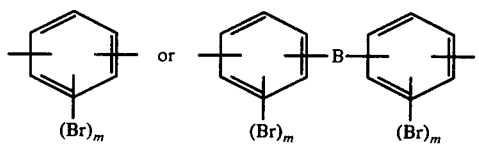
(III)

wherein $R_1$, A, Z, Y, l, p and q have the same meanings as defined hereinafter and n is 3 to 40, obtained by reacting, in the liquid phase, at least one bromine-containing compound having the formula (I)

$$H(OR_1)_pOAO(R_1O)_qH \qquad (I)$$

wherein $R_1$ is alkylene having 2 or 3 carbon atoms, p and q are integers of at least 1 and the sum of p and q is an integer of not more than 4 and A is

[chemical structures showing brominated phenyl and biphenyl groups with $(Br)_m$]

wherein m is an integer of one to 4 and B is alkylene or alkylidene having one to 6 carbon atoms or sulfone, with at least one phosphorus halide compound having the formula (II)

$$\begin{array}{c} Z \\ | \\ X-P-X \\ \| \\ (Y)_l \end{array} \qquad (II)$$

wherein Z is —$R_2$ or —$OR_2$, $R_2$ is alkyl or aryl, X is chlorine or bromine, Y is sulfur or oxygen and l is zero or 1, wherein the molar ratio of the formula (I) compound:formula (II) compound is 1.0:0.9 to 1.5 and wherein the reaction temperature is from zero to 180° C.

2. A polymer as claimed in claim 1, wherein the bonded position of bromine in the compound of formula (I) is ortho-position.

3. A polymer as claimed in claim 1, wherein $R_2$ is aryl.

4. A polymer as claimed in claim 1, wherein Z is —$R_2$ and said —$R_2$ is aryl.

5. A polymer as claimed in claim 1, wherein l is 1 and Y is oxygen.

6. A polymer as claimed in claim 1, wherein n is 5 to 20.

7. A polymer as claimed in claim 2, wherein the formula (I) compound is

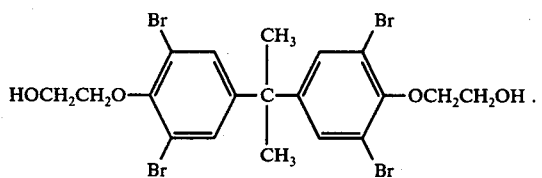

8. A polymer as claimed in claim 2, wherein the formula (I) compound is

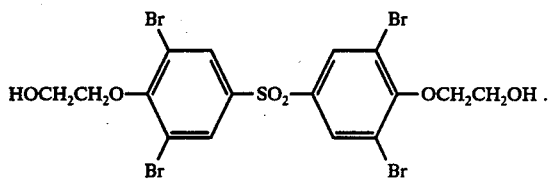

9. A polymer as claimed in claim 7, wherein the formula (II) compound is phenyldichlorophosphine oxide or phenyldibromophosphine oxide.

10. A polymer as claimed in claim 3, wherein the formula (II) compound is phenoxydichlorophosphine oxide or phenoxydibromophosphine oxide.

11. A polymer as claimed in claim 1, wherein the molar ratio of the formula (I) compound to the formula (II) compound is 1.0:0.9 to 1.1.

12. A polymer as claimed in claim 1, wherein the reaction temperature is 60°–160° C.

13. A polymer as claimed in claim 1, wherein the reaction is a solution polymerization.

14. A polymer as claimed in claim 1 in which the reaction is melt polymerization carried out at a temperature of 120° to 150° C for from 0.5 to 3.0 hours.

15. A polymer as claimed in claim 1 in which the reaction is solution polymerization carried out at a temperature of 60° to 160° C for from 0.1 to 8 hours.

* * * * *